United States Patent [19]
Cowan

[11] Patent Number: 6,024,214
[45] Date of Patent: Feb. 15, 2000

[54] CONTAINER FOR STORING AND DISPLAYING AN ARTICLE

[76] Inventor: David M. Cowan, 553 8th St., Apt. 3L, Brooklyn, N.Y. 11215

[21] Appl. No.: 09/255,403

[22] Filed: Feb. 22, 1999

[51] Int. Cl.[7] .................................................. B65D 85/57
[52] U.S. Cl. ........................ 206/308.1; 206/232; 206/313
[58] Field of Search ................................... 206/307, 232, 206/308.1, 309–313, 493

[56] References Cited

U.S. PATENT DOCUMENTS

| | | |
|---|---|---|
| 4,694,954 | 9/1987 | Moss . |
| 4,702,369 | 10/1987 | Philosophe . |
| 4,718,547 | 1/1988 | MacTavish . |
| 4,759,442 | 7/1988 | Gregorson et al. . |
| 4,760,914 | 8/1988 | Gelardi et al. . |
| 4,771,883 | 9/1988 | Herr et al. . |
| 4,773,061 | 9/1988 | Stark et al. . |
| 4,805,769 | 2/1989 | Soltis et al. . |
| 4,871,065 | 10/1989 | Hehn et al. . |
| 4,881,640 | 11/1989 | Herr et al. . |
| 4,899,875 | 2/1990 | Herr et al. . |
| 4,916,567 | 4/1990 | Grobecker et al. . |
| 5,383,554 | 1/1995 | Cowan . |
| 5,842,563 | 12/1998 | Herr et al. ........................... 206/308.1 |
| 5,878,879 | 3/1999 | Liao ..................................... 206/308.1 |
| 5,915,549 | 6/1999 | Palmer et al. ....................... 206/308.1 |
| 5,936,935 | 8/1999 | Hanakawa et al. .................. 206/308.1 |

FOREIGN PATENT DOCUMENTS

WO8705884  10/1987  WIPO .

Primary Examiner—Paul T. Sewell
Assistant Examiner—Luan K. Bui

[57] ABSTRACT

An improved container that may be used for displaying an article, particulary compact discs, for sale and thereafter for storage has a drawer and a tray, both of which can slide in and out of the container housing. The improvement comprises a tray in the shape of a "U" with a provision that minimizes or prevents the legs of the U-shaped tray from snagging on the housing and preventing the proper functioning of the drawer of the container.

11 Claims, 8 Drawing Sheets

CONTAINER FOR STORING AND DISPLAYING AN ARTICLE

BACKGROUND OF THE INVENTION

This invention is concerned with an improved container for storing and displaying articles, particularly compact discs. More particularly the present invention is an improvement over U.S. Pat. No. 5,383,554 (Cowan, Jul. 24, 1995).

Containers for storing or displaying articles are well known. See, e.g., U.S. Pat. Nos. 4,694,954; 4,702,369; 4,718,547; 4,759,442; 4,760,914; 4,771,883; 4,773,061; 4,805,769; 4,871,065; 4,881,640; 4,899,875; 4,916,567 and 5,383,554; and PCT Application WO 87/05884. All of the documents identified herein, including the foregoing, are incorporated herein by reference in their entireties for all purposes.

Some of the foregoing documents concern containers comprising insertable drawers. Patents of Herr (U.S. Pat. Nos. 4,771,883, 4,881,640, and 4,899,875) relate to a drawer for storing discs within an outer housing. Tab members prevent the drawer from being completely withdrawn from the housing, and there are means for preventing outward movement of the drawer unless sufficient force is used. Stark (U.S. Pat. No. 4,773,061) relates to a carrier for a disc, comprising releasable latching means on the carrier frame for selectively engaging a disc and urging the disc into engagement with disc support means. Grobecker (U.S. Pat. No. 4,916,567) relates to a tray that is inserted into a bottom section and a latching element that latches a retaining element in its closed position. Frost (PCT WO 87/05884) concerns a shell, a drawer that can slide to and fro in the shell, and lock means for retaining the drawer inside the shell in a closed locked position. When pressure is applied to the lock means, the drawer is released from the closed locked position. Philosophe (U.S. Pat. No. 4,702,369) relates to a storage container having a drawer-like receptacle and shell-like cover for releasably supporting the drawer-like receptacle.

The most relevant of the foregoing patents is Cowan (U.S. Pat. No. 5,383,554), which is specifically incorporated herein by reference. In the container of that patent, the rear spine of the tray card sometimes caught on the rear cross brace of the tray, which is indicated as 310 in FIG. 44 of that patent. There is a suggestion in Cowan's patent for use of a tray that "may consist of little more than two side bars that help maintain the . . . tray in the proper position in the container and one or more narrow cross-pieces that connect the side bars." (Col. 20, lines 33 to 37.) There is a problem with such an arrangement with only one narrow cross-piece at the end of the tray at the opening of the container. The problem is that the end parts of the legs of the U-shaped tray tend to snag on the housing and prevent the proper functioning of the tray in the container.

SUMMARY OF THE INVENTION

An improved container has now been developed that overcomes the above-noted problems and also has numerous other advantages that will be apparent to those skilled in the art.

Generally, this improved container comprises:

(a) a housing;

(b) a drawer for carrying a first article, the drawer being slidably mounted in the housing so that it can be moved between a fully closed position in the housing and a fully open position in the housing; and (c) a tray for carrying a second article, the tray being slidably mounted in the housing so it can be moved between a fully closed position in the housing and a partially extended position in the housing, the drawer in its fully open position extending from the housing beyond the tray when the tray is in its partially extended position;

the container having urging means for urging the tray towards its partially extended position as the drawer is moved towards its fully open position, in which the improvement comprises the tray being U-shaped and having means for minimizing or preventing legs of the U-shaped tray from snagging on the housing and preventing the proper functioning of the drawer of the container.

Unfortunately with the rear brace removed, when the drawer is pulled open firmly, the tray legs flex inward, causing the tabs to pull in to the container. With the tabs out of the windows, the booklet can now slip back beyond the retaining ribs. This causes a catastrophic jam of the container.

The means for minimizing or preventing legs of the U-shaped tray from snagging on the housing and preventing the proper functioning of the drawer of the container may be, for example:

(a) legs of the U-shaped tray that are flared outwardly in the plane of the tray;

(b) at least one tab on an outside edge of at least one of the legs of said tray, said tab having an outside edge projecting either upwardly or downwardly to match a complementary edge of a slot in the side of the housing;

(c) at least one tab on the outside edge of at least one of the legs of said tray, said tab having an upper surface angled either upwardly or downwardly to match a complementarily angled edge of a slot in the side of the housing; and (d) a profiled cross brace that guides the tray card's rear spine past and under the center portion, without catching; and (e) an additional stop surface added to the drawer's sidewalls, making the drawer stop without applying a force on the tray.

Additional improvements comprise a wiper on at least one of the inner edges of the legs of the tray, said wiper being angled upwardly in order to maintain a booklet in place. Preferably, there is a wiper on both of the inner edges of the legs of the tray.

The first article may be an audio tape cassette, a videotape cassette, a compact disc, a compact disc-ROM (also called CD-ROM, "ROM" indicating "read-only memory"), a video laser disc, a floppy disc, jewelry, and cosmetics, and most preferably a compact disc. Yet other articles may be displayed and stored in the container of this invention.

The improved container has means to hold a second article (e.g., material such as a booklet describing the first article) and means to at least partially eject the second article from the housing means as the drawer means is being moved towards the more open position.

The invention as it relates to a container for compact discs offers yet further advantages. The container is easier to open than the known jewel boxes and allows the compact disc to be removed more easily. There are no hinges or thin extensions to break. A second article such as a booklet may be partially ejected from the container when the drawer means is opened, thereby facilitating removal of the booklet and avoiding the problems encountered with known jewel boxes.

The single-plastic construction of preferred embodiments facilitates recycling.

Generally, all of the features of the basic container described in U.S. Pat. No. 5,383,554 may be incorporated into the improved container of this invention. Other features and advantages of this invention will be apparent to those skilled in the art.

BRIEF DESCRIPTION OF THE DRAWINGS

These drawings are for illustrative purposes only and should not be used to unduly limit the scope of the invention.

DETAILED DESCRIPTION OF THE INVENTION

In the FIGS., wherever possible, the same reference numerals are used to indicate the same part or similar parts.

Figure 1:
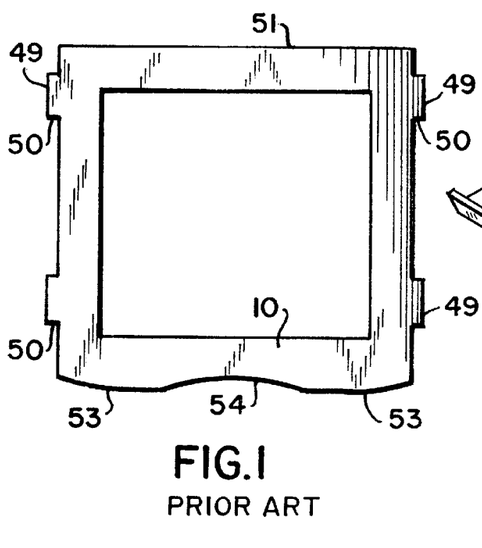
FIG. 1 is a top view of the four-sided tray illustrated as 310 in FIG. 44 of U.S. Pat. No. 5,383,554.

FIG. 1 is a top view of the four-sided tray depicted as 310 in FIG. 44 of U.S. Pat. No. 5,383,554. Tray 10 has tabs 49 on its sides having front edges 50. Rear brace 51 serves to stabilize the tray 10. Rib 90 prevents the booklet from falling off the tray 10. Cutout 54 and rounded corners 53 allow the leading end and sides of a booklet to be easily and firmly grasped and the booklet to be pulled out. To allow the container to use a standard tray card 20, required eliminating the rear cross brace 51 from the tray 10 shown in FIG. 1.

Figure 2:
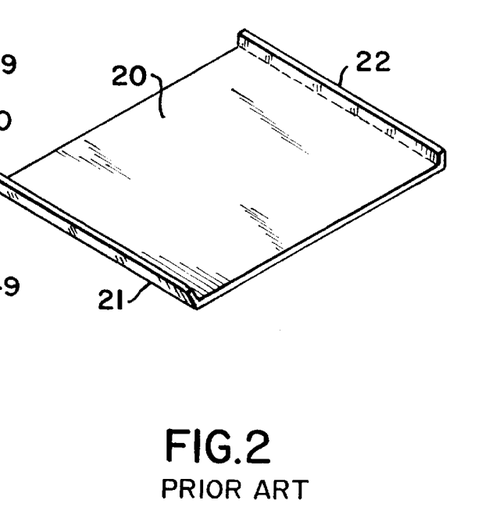
FIG. 2 is a perspective view of a tray card. The rear spine on the tray card sometimes caught on end of the tray described in U.S. Pat. No. 5,383,554.

FIG. 2 is a perspective view of a tray card 20 having a front spine 21 and a rear spine 22. The rear spine 22 on the tray card 20 often catches on the front edge of the rear cross brace 51.

Figure 3:
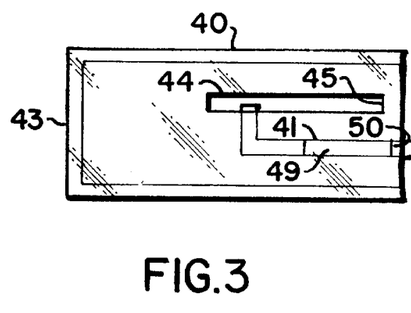
FIG. 3 is side view of the side of one end of the housing of the container illustrating how the end of a leg of an ordinary U-shaped tray can slip out and down from the slot in the housing and jam.

FIG. 3 is side view of the side of one end of the container of the invention. Top 40 and bottom 43 are indicated. FIG. 3 illustrates how the end of a leg of an ordinary U-shaped tray 41 can slip out and down from the slot 44 in the container and jam. The leading edge 50 of tab 49 is shown down and forward of the leading edge 45 of slot 44.

Figure 4:
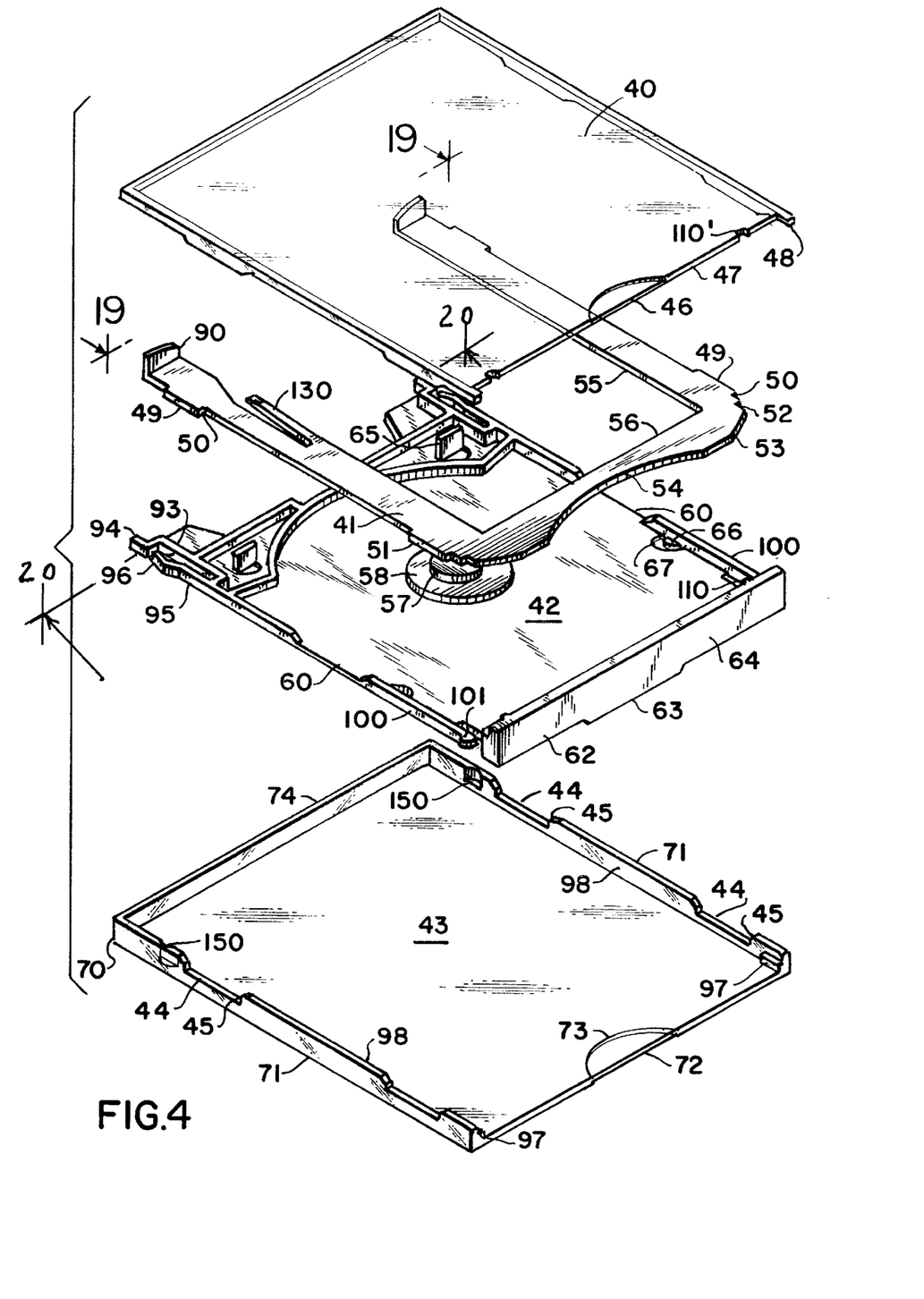
FIG. 4 is an exploded view of one embodiment of the invention.
Figure 5:
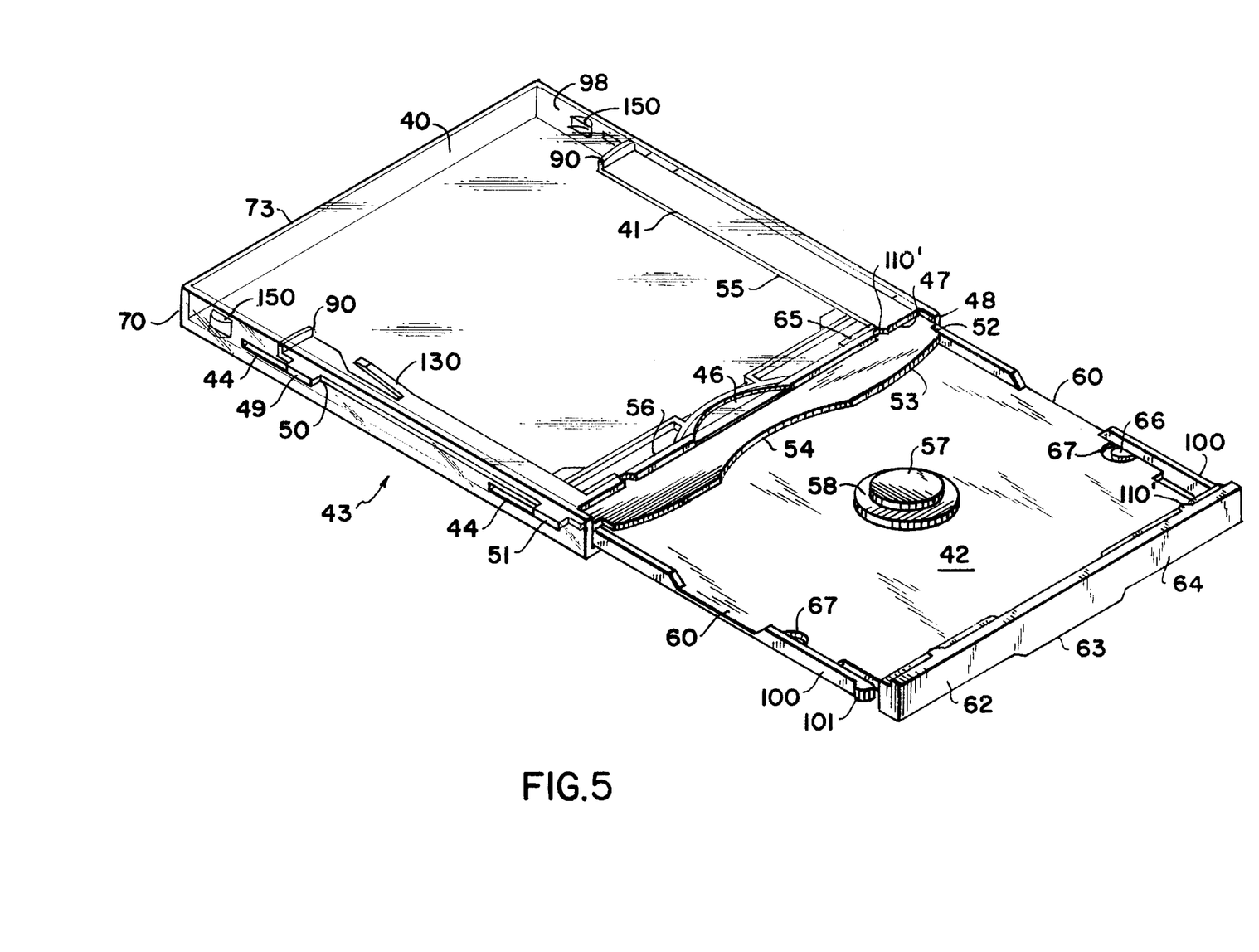
FIG. 5 is a view of the assembled embodiment of FIG. 4.

FIG. 4 is an exploded view of one embodiment of the invention. FIG. 5 is a view of the assembled embodiment of FIG. 4. FIGS. 4 and 5 show one embodiment of the invention used for a compact disc and the booklet for the compact disc (for the sake of clarity, neither the compact disc nor the booklet is shown in these figures). The container comprises top section 40 and bottom section 43, tray 41, and drawer 42.

Top 40 has front edge 47 and conical depression 46, and the bottom 43 has conical depression 73 at its front to facilitate a tight grip on front 62 of drawer 64 so that the drawer can be pulled out of the housing of the container easily. Rib 63, which is at the bottom of the front of drawer 64 and which mates with cutout 72 in bottom 43 when the drawer 42 is fully closed, provides an additional gripping location for this purpose. Reinforcements 190 are on each side of the front of bottom 43.

Tray 41 is in the form of a U, the inside front of which is designated by reference numeral 56, and has four laterally projecting tabs 49. Each of tabs 49 has front stop surface 50 (only some of which are shown). The front portion of tray 41 has rounded cutout 54, two side notches 52, and two rounded corners 53. When a second article such as a booklet for a compact disc lies on the tray, cutout 54, side notches 52, and rounded corners 53 provide free or open area under the article, thereby allowing the article to be gripped at its front middle or its front sides to facilitate its removal from the tray. The left leg of the U-shaped tray 41 also has upwardly projecting retainer wiper 130, which is also shown enlarged in FIG. 16.

Drawer 42 comprises a planar part, sidewalls 100 (each having cutout 60), front member 62 (which carries bottom projecting rib 63), back wall 180 (which is curved in its middle region to accommodate the compact disc), and upstanding posts 65. Drawer 42 carries hub 57 and spacer 58. When the compact disc is located in the drawer, the hole in the middle of the disc mates with hub 57 and the disc is supported by washer-like spacer 58 so that the compact disc does not ride directly on the bottom of tray 42. Drawer 42 has two lateral circular cutouts 67 to cooperate with tabs 66, as will be described below. Sidewall 100 terminates in control surface 101.

Bottom 43 comprises two sidewalls 71 each having windows (cutouts) 44, and a back wall 74. The bottom 43 has a conical depression 73 (similar to conical depression 46 in top 40) and cutout 72.

The four pieces of the container, i.e, top 40, tray 41, drawer 42 and bottom 43, may be assembled by placing tray 41 between top 40 and bottom 43 with tabs 49 in their respective windows 44 and then joining top 40 and bottom 43 by, for example, sonic welding. After joining, sidewalls 48 of top 40 and sidewalls 71 of bottom 43 form the sidewalls of the container, and each tab 49 is locked in its respective window 44. The rear edge of drawer 42 is then partially placed in the housing with the rear end of drawer 42 resting on bottom 43 and drawer 42 is pushed inwardly, towards its fully closed position.

Because the tops of posts 65 are sloped downwardly towards the rear of drawer 64, when the posts hit the leading edge of tray 41, they raise and then slide under the front portion of tray 41. The front portion remains raised as long as the posts 65 are under the front portion of the tray 41. Once the posts clear the front portion (so that they are in cutout 55), the resilience of the front portion of the tray 41 causes it to move down again to its normal planar position. The drawer 42 is thereby "locked" in its normal operating position so that it can slide from its fully open position back towards its fully closed position. (To remove the drawer 42, while the drawer 42 is fully extended beyond the housing of the container, the rear portion of the tray is lifted or buckled, thereby allowing posts 65 to pass under the rear portion of the tray as the drawer 42 is pulled outwardly.)

During normal operation and starting with the drawer 42 and tray 41 completely closed, as drawer 64 is pulled from its fully closed position (when it is completely inside the housing and only front 62 of the drawer is visible) towards its fully open position (when it is extended from the housing as far as it can travel during normal operation), increasingly more of the drawer and the article carried by the drawer pass out of the housing and posts 65 approach the front inner surface 56 of cutout 55. At some point, posts 65 will hit or abut surface 56 of the front portion of the tray 41. Thus, further continued outward movement of the drawer 42 will force tray 41 to move outwardly, which outward movement of the tray 41 will continue until leading surface 50 of each of four tabs 49 hits its respective stop surface 45 of each window 44. Because outward movement of the tray will thereby be halted and because posts 65 abut surface 56, outward movement of the drawer will also thereby be halted.

At this point, the drawer will be in its fully extended position of its normal operation and the tray will be in its position of maximum extension from the housing. With a standard size compact disc and a standard size booklet, the front of the drawer will extend roughly five inches from the front of the housing and the tray will extend roughly one-half inch from the front of the housing. Because most of the compact disc will not be covered by the booklet or the tray, the disc can be easily removed. The booklet is easily removable because cutout 54, notches 52, and rounded corners 53 allow the leading end and sides of the booklet to be easily and firmly grasped and the booklet pulled out. Ribs 90 at the rear end of tray 41 will abut the trailing edge of the booklet as the tray 41 moves out of the housing, thereby insuring that the booklet will not remain inside the housing as the tray moves forward towards its partially extended position at the maximum extent of its outward travel.

After use, the compact disc may be replaced in the drawer with the central hole of the disc mating with the hub and the booklet may be replaced on the tray. As the drawer is pushed inwardly towards its fully closed position, at some point the inner surface of the front of the drawer will hit the booklet and/or the front edge of the tray. Continued inward movement of the drawer will then push the booklet and tray into the housing. When the drawer is in its fully closed position, the tray will also be in its fully closed position (i.e., completely inside the housing).

The drawer may be modified to hold two compact discs, or to hold compact discs of different sizes. More than one drawer and/or more than one tray may be used in the same housing. Also, although not shown in FIGS. 3 and 4, releasable locking means may be used with the container.

Figure 6:
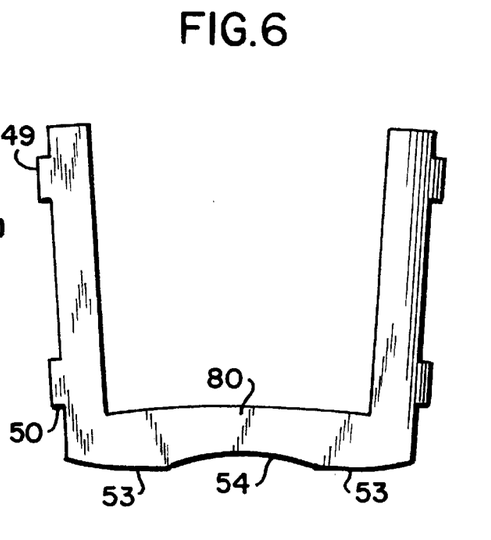
FIG. 6 is a top view of one version of the tray of the invention.

FIG. 6 is a top view of one version of the tray 80 of the invention. Tray 80 has tabs 49 on its sides having front edges 50. The legs of the U-shaped tray 80 are splayed outward. When inserted in the housing, they press against the walls of the housing. Cutout 54 and rounded corners 53 allow the leading end and sides of a booklet to be easily and firmly grasped and the booklet to be pulled out.

Figure 7A:
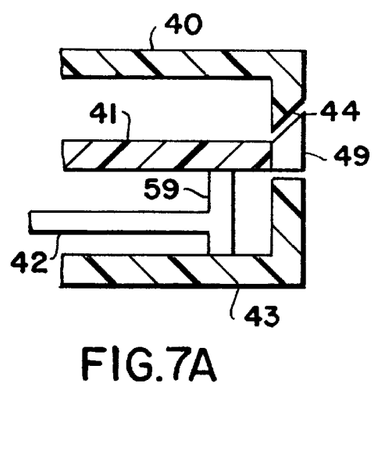
FIG. 7A is another version of the tray of the invention shown in partial cross section view taken across the rear part of the container as indicated in FIG. 7B.
Figure 7B:
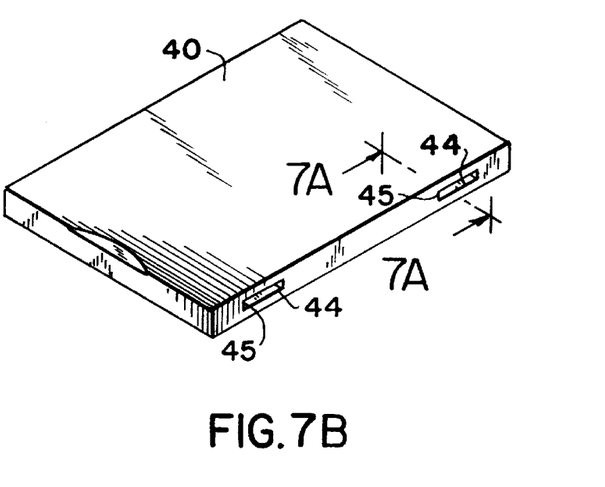
FIG. 7B is a perspective reference view of the container indicating the partial cross section view in FIG. 7A.

FIG. 7A is another version of the tray of the invention shown in partial cross section view taken across the rear part of the container as indicated in FIG. 7B. Top 40, tray 41, drawer 42 having sidewall 59, and bottom 43 comprise the container of this invention. Tab 49 has an upwardly angled end, which matches a complementarily angled window 44, thereby preventing tab 49 from slipping out of window 44.

FIG. 7B is a perspective reference view of the container indicating the partial cross section view in FIG. 7A.

Figure 8:
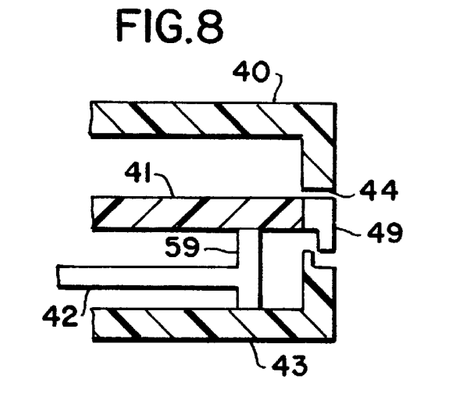
FIG. 8 is another version of the tray of the invention shown in partial cross section view.

FIG. 8 is another version of the tray 41 of the invention shown in partial cross section view. Tab 49 has a downward projection at its end that overlaps an upward projection in window 44, thereby preventing tab 49 from slipping out of window 44.

Figure 9:
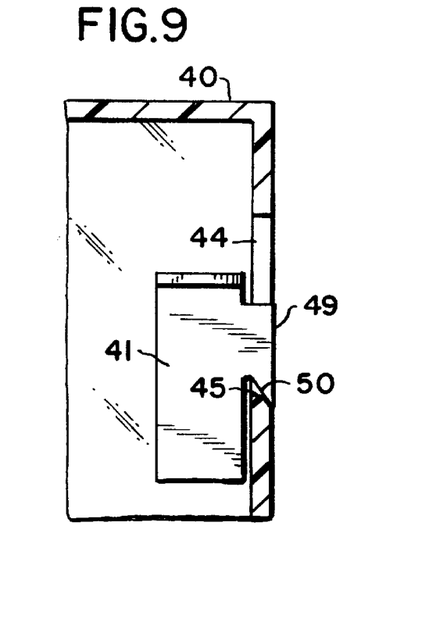
FIG. 9 is another version of the tray of the invention shown in partial cross section view.

FIG. 9 is another version of the tray of the invention shown in partial cross section view. Tab 49 has a forward angled projection on its leading edge 50 which matches a complementarily angled forward edge of window 44, thereby preventing tab 49 from slipping out of window 44.

Figure 10A:
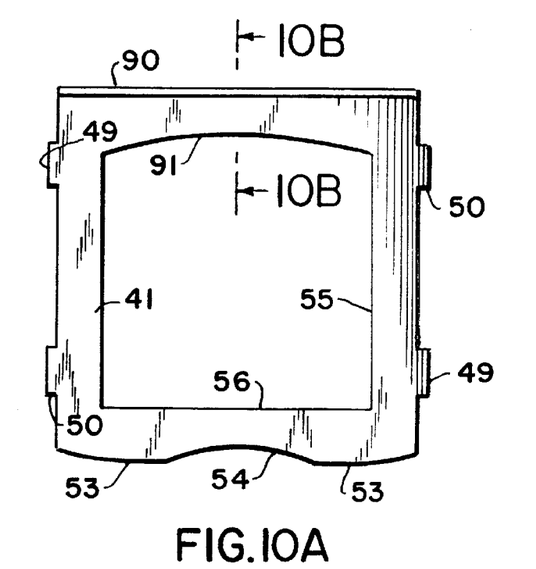
FIG. 10A is a top view of a tray of the invention in which the legs of the U-shaped tray are connected by a brace.

FIG. 10A is a top view of a tray 41 of the invention in which the legs of the U-shaped tray are connected by a rear brace between the legs of the U. The curved cross brace guides the tray card's rear spine past and under the center portion, without catching. The rear brace has a rib 90. The remaining numbered parts have been described above.

Figure 10B:
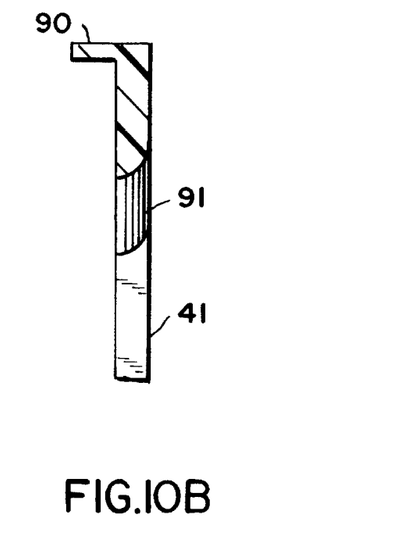
FIG. 10B is a partial cross section of the brace shown in FIG. 10A taken along the view line.
Figures 11, 12:
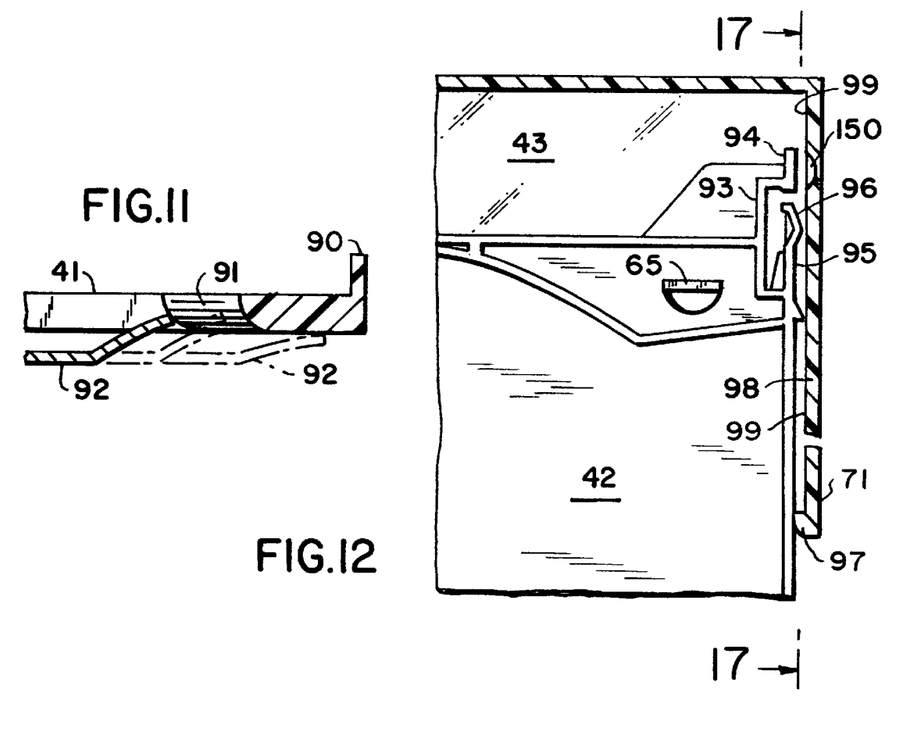
FIG. 11 is a partial cross section of the brace as shown in FIG. 10A, in which the end spine of the tray card is shown as it moves relative to the brace.
FIG. 12 shows a modification of the drawer that obviates the need for modification of the legs of the U-shaped tray.

FIG. 10B is a partial cross section of the brace shown in FIG. 10A taken along the view line indicated. Rounded profile 91 serves to mininize or prevent the rear spine 22 of tray card 20 from catching on the rear brace as illustrated in FIG. 11, which is the partial cross section of the brace as shown in FIG. 10B, in which the end spine of the tray card is shown as it moves relative to the brace. FIG. 11 shows how the profiled edge serves to minimize the possibility of snagging.

FIG. 12 shows a modification of the drawer 42 that obviates the need for modification of the legs of the U-shaped tray 41. Bottom 43 has sidewall 98, the inner surface of which has ribs 99 (FIG. 18) to reduce stiction (stickyness). Half height guide block 97 is a control surface. Sidewall 98 also has notch 150, which is described in more detail below. Drawer 42 has a control surface 94, arm 95 and wiper 96. The gap between the drawer sidewall 100 and the inside of the housing enables the drawer 42 to function, even if small pieces of grit have entered the housing.

Figure 13:
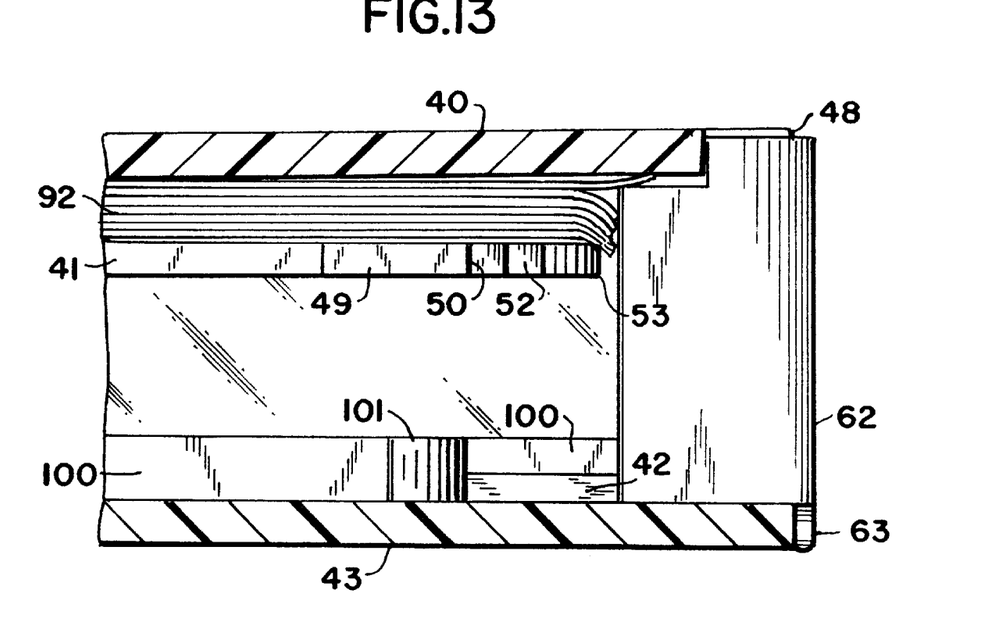
FIG. 13 is a partial side view of the front end of an ordinary container showing how the end of a booklet carried on the tray can become wedged between the top of an ordinary drawer and the housing.

FIG. 13 is a partial side view of the front end 62 of the housing of an ordinary container comprised of top 40 and bottom 43 showing how the end of a booklet 150 carried on the tray 41 becomes wedged between the top of the drawer 42 and the housing of the container.

Figure 14:
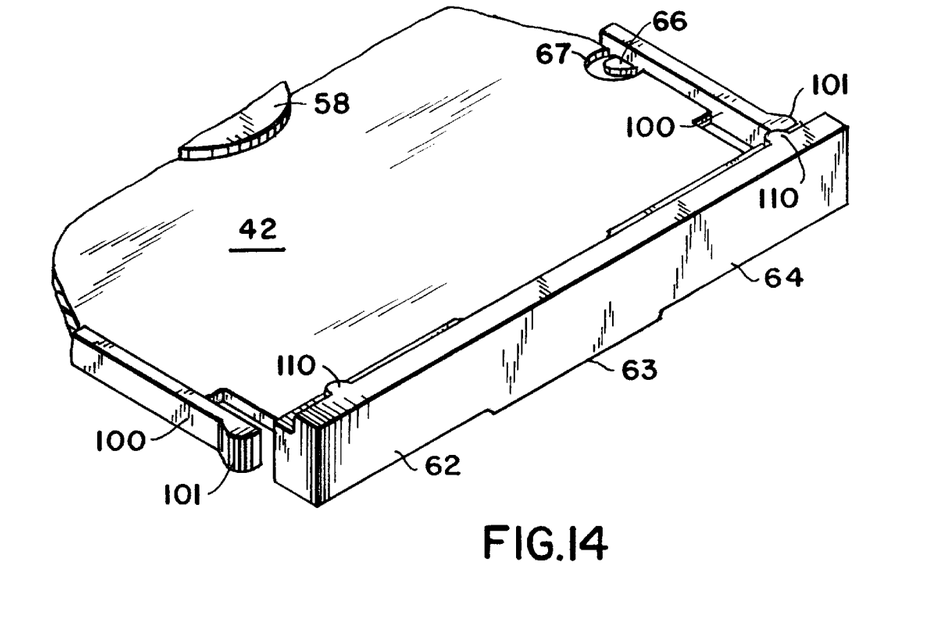
FIG. 14 is a partial perspective view of the front end of the drawer.

FIG. 14 is a partial perspective view of the front end of the drawer 42. All of the reference numerals except push tabs 110 have been defined above. Push tabs 110 serve to minimize or eliminate the tendency of the booklet becoming wedged between the top of the drawer 42 and the housing of the container.

Figure 15:
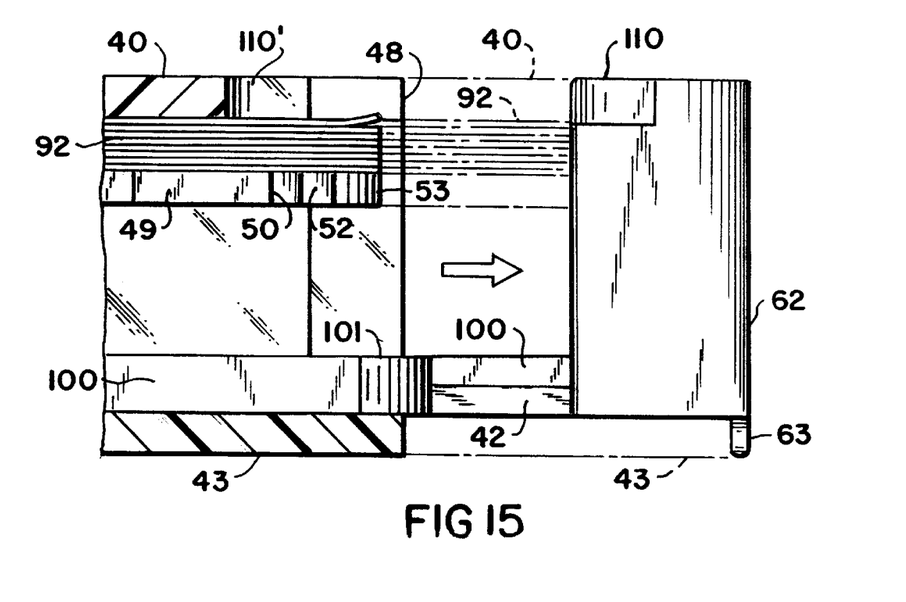
FIG. 15 is a partial side view of the front end of the improved container of the invention showing how the end of a booklet carried on the tray is prevented from becoming wedged between the top of the drawer and the housing.

FIG. 15 is a partial side view of the front end of the improved container of the invention showing how the end of a booklet 150 carried on the tray 41 is prevented from becoming wedged between the top of the drawer 42 and the housing of the container. Push tabs 110 fit into complementary recesses 110' in the top 40, which is best seen in FIG. 4. All of the other reference numerals have been defined above.

Figure 16:
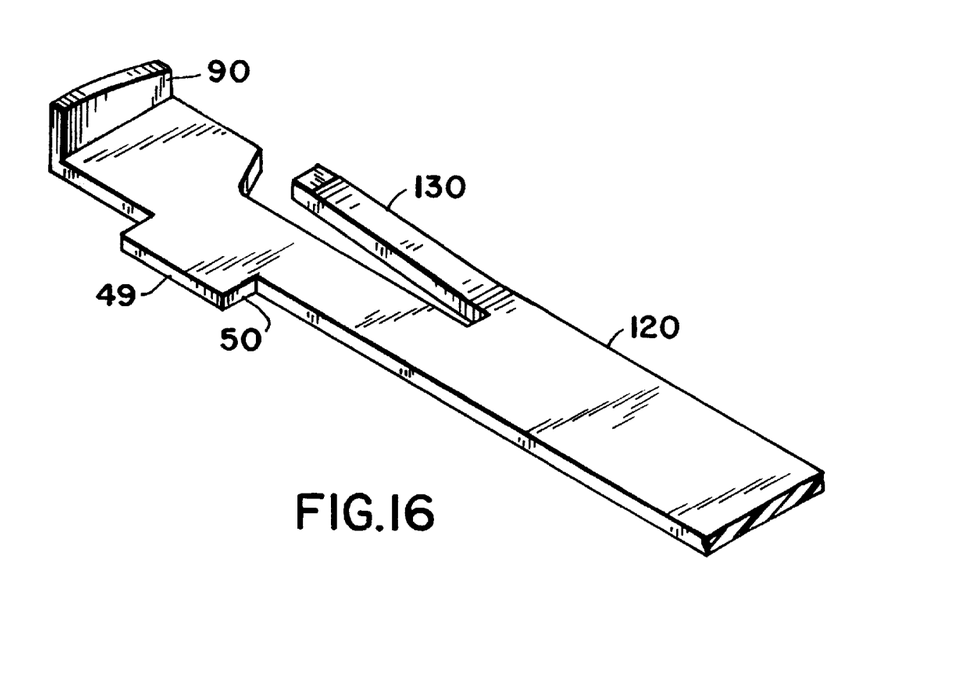
FIG. 16 is a partial perspective view of one end of a leg of the U-shaped tray illustrating a retainer wiper that minimizes or prevents the booklet from sliding out when the drawer is opened.

FIG. 16 is a partial perspective view of one end of a leg 120 of the U-shaped tray 41 illustrating a retainer wiper 130 that minimizes or prevents the booklet 150 from sliding out when the drawer 42 is opened. Reference numerals 49, 50 and 90 are defined above. The wiper 130 pushes up on booklet 150 to trap it against the top. When drawer is pulled open, the booklet will not simply slide out—covering the disc.

Figure 17:
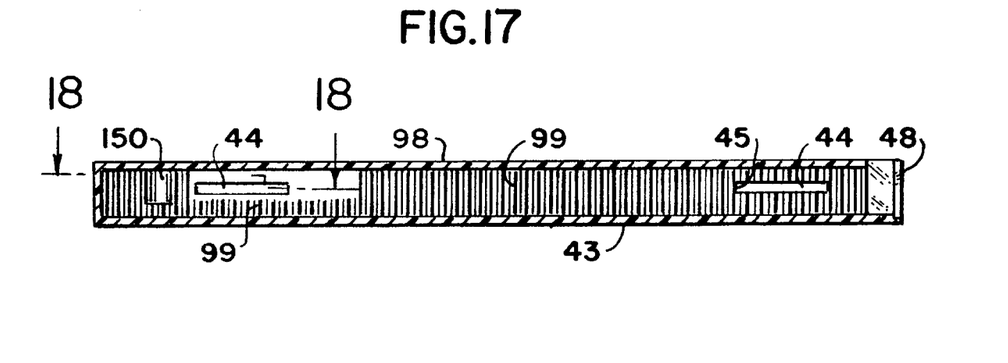
FIG. 17 is a side view from the inside of the housing illustrating the slots for the tabs in the sides of the tray, some of the vertical ridges on the sides of the housing, and a notch in the side.

FIG. 17 is a side view from the inside of the housing taken along the view line 17—17 shown in FIG. 12 comprised of top 40 and bottom 43 illustrating the slots 44 for the tabs in the sides of the tray, some of the vertical ridges 98 on the sides of the housing, and a notch 150 in the side that serves to release the pressure on the wiper 96 when the drawer is pushed all the way back into the housing. All of the other reference numerals have been defined above.

Figure 18:
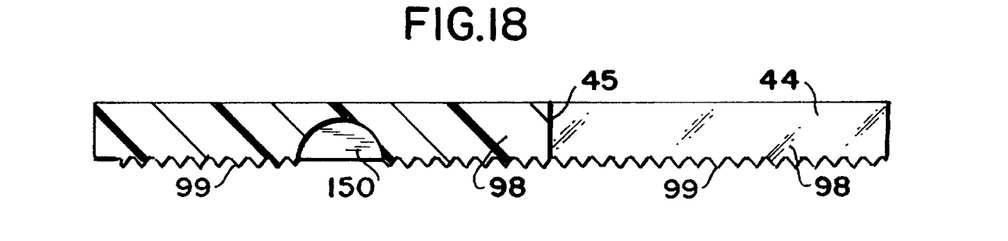
FIG. 18 is a partial top section view taken along view line 18—18 of FIG. 17 illustrating the ridges along the inside surfaces of the sides of the housing and also the notch in the inside surface of the side of the housing.

FIG. 18 is a partial top section view taken along view line 18–18 shown in FIG. 17 illustrating the ridges 98 along the inside surfaces of the sides of the housing and also the notch 150 in the inside surface of the side of the housing. All of the other reference numerals have been defined above. The vertical ribs that are found on the standard jewel box have been placed on the inside of the housing of the invention to reduce stiction or static friction which may cause the drawer to chock when pushing it back in to the case. These ribs also provide a place for dirt to go when the wiper 96 slides against the wall.

Figure 19:
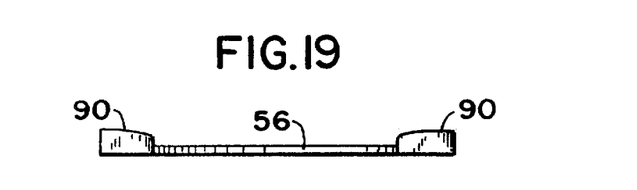
FIG. 19 is an elevation view of the tray 41 taken from the view point 19—19 indicated in FIG. 4.

FIG. 19 is an elevation view of the tray 41 taken from the view point 19—19 indicated in FIG. 4. Shown are the cross piece 56 and the ribs 90.

Figure 20:
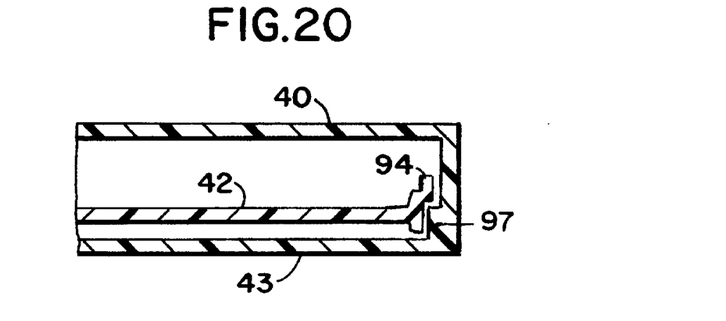
FIG. 20 is a partial cross section view of the top 40, the drawer 42, and the bottom 43 showing the projection 94 overlapping the complementary projection 140 in the side wall of the bottom 43, thereby maintaining the drawer a small distance away from the sidewall of the bottom 43.

FIG. 20 is a front view of the top 40, the drawer 42 sectioned along the line 20—20 in FIG. 9, and the bottom 43 showing the projection 94 notched at 140 so that it fits around half height guideblock 97.

"Drawer" should be understood to have the widest possible meaning and to include both planar and non-planar members, with and without sidewalls, and with and without cut-outs (or apertures). "Tray" should similarly be understood to have the widest possible meaning.

As used herein, for example, in the phrase "first means for moving a first article into the housing to protect it and substantially out of the housing to allow it to be removed," by "substantially out of the housing" is meant that more than 50 percent, usually at least 60 percent, desirably at least 70 percent, more desirably at least 80 percent, and most desirably at least 90 percent of the first article will extend beyond the housing.

As used herein, for example, in the phrase "third means for moving the second article no more than partially out of housing to allow it to be removed," by "no more than partially out of housing" is meant that less than 40 percent, usually less than 35 percent, desirably less than 25 percent, more desirably less than 20 percent, and most desirably less than 10 percent of the second article will extend beyond the housing.

Thus, with a preferred container, e.g., the container of FIGS. 4 and 5, if the first article is a compact disc, which is typically about 120 millimeters (about 4.7 inches) in diameter, and if the second article is a standard size booklet for the compact disc, which booklet is about 4.75 inches by 4.75 inches, and if the tray and drawer are extended to their respective maximum travels from the housing, only a few millimeters of the trailing edge of the disc but about 4.25 inches of the booklet will remain in the housing. Generally, when the container is used for compact discs and their booklets, the tray in its partially extended position will not extend more than about one inch from the housing and the drawer will not extend more than about six inches from the housing.

As used herein, by "partially extended position" when referring to the tray is meant that less than 40 percent, usually less than 35 percent, desirably less than 25 percent, more desirably less than 20 percent, and most desirably less than 10 percent of the tray will extend beyond the housing.

As will be apparent, the present invention has many benefits, which for convenience will be described with respect to containers of this invention for compact discs. It should be understood that many of these benefits will be realized with articles other than compact discs.

The container of this invention may be the same size and shape as the industry standard compact disc jewel box. Thus, it can fit in standard retailing fixtures and in consumers' storage units. The container of this invention is compatible with the graphic inserts currently used in the jewel box. That allows a distributor to choose either package (standard jewel box or a container of this invention) without having to prepare special artwork. It also allows consumers to replace jewel boxes with a container of this invention and maintain the visual appeal of the standard jewel box.

The booklet is often difficult to remove from the standard jewel box because it cannot be gripped without lifting its edge and because there are raised surfaces that must be cleared. The booklet can also be difficult to replace because the four (and sometimes six) tabs in the standard jewel box that hold the booklet are not easy to clear.

In contrast, the container of this invention allows the booklet to be removed or replaced without complication. It is easy to remove because the tray has cut-away areas at both sides and in the center of the tray portion that extends out from the case. That allows the user to grab the booklet at the front sides or middle. The booklet can also be easily removed because there is nothing but friction holding the booklet in place. Replacing the booklet is also easier because there are no tabs or other structures that will cause the booklet to jam or misfeed.

The partial ejection of the booklet allows the packages to be stacked, like toy building blocks, while still providing easy access to the disc and the booklet without unstacking.

The container of this invention can utilize the tray to limit the vertical motion of the disc on the hub or spindle in the drawer when the drawer is closed, ensuring that the disc cannot come off the spindle. Because the motion of the disc is so limited, the spindle on which the disc sits need not grip the disc. The use of a simple spindle (as opposed to a more complex spindle that grips the disc, as in the standard jewel box) makes it easier to remove and replace the disc. Sometimes the disc can be difficult to remove from the standard jewel box's gripping spindle, requiring that the disc be significantly deformed for removal. Sometimes the disc may not be properly replaced on the gripping spindle, thereby allowing the disc to fall from the box when it is opened. Thus, the container of this invention reduces the chance of damaging the disc during shipment and reduces the chance of a loose disc falling when the box is opened (which could cause the disc to pick up contaminants and become scratched).

The hingeless design of the container of this invention eliminates the gray bar on the face of the standard jewel box and in fact allows for the use of a larger booklet. Such a larger booklet would provide a stronger image for retail and an easier-to-read format (e.g., larger type) without changing the size of the package. The booklet graphics are visible, e.g., through transparent planar top 40 (FIG. 4).

When releasably locked in its open expanded display position, the drawer will not normally be movable to its fully closed position unless it is, e.g., forced to move inward, i.e., the drawer in its releasably locked position will not normally be inwardly movable. A drawer that must be moved inward to release the releasable locking means is considered not to normally be inwardly movable.

The foregoing specification and drawings have thus described and illustrated an improved container, which fulfills all the objects and advantages sought therefor. Many changes, modifications, variations and other uses and applications of the subject invention will, however, become apparent to those skilled in the art after considering this specification which discloses the preferred embodiments thereof. All such changes, modifications, variations and other uses and applications which do not depart from the spirit and scope of the invention are deemed to be covered by the invention, which is to be limited only by the claims which follow.

I claim:

1. In a container comprising:
   (a) a housing;
   (b) a drawer for carrying a first article, the drawer being slidably mounted in the housing so that it can be moved between a fully closed position in the housing and a fully open position in the housing; and
   (c) a tray for carrying a second article, the tray being slidably mounted in the housing so it can be moved between a fully closed position in the housing and a partially extended position in the housing, the drawer in its fully open position extending from the housing beyond the tray when the tray is in its partially extended position;
   the container having urging means for urging the tray towards its partially extended position as the drawer is moved towards its fully open position,
the improvement which comprises the tray being U-shaped with means for minimizing or preventing legs of the U-shaped tray from snagging on the housing and preventing the proper functioning of the drawer of the container or allowing the second article to pass behind, thereby interfering with the drawer action.

2. The improved container of claim 1 wherein the legs of the U-shaped tray are flared outwardly in the plane of the tray.

3. The improved container of claim 1 wherein the tray has at least one tab on an outside edge of at least one of the legs of said tray, said tab having an outside edge projecting either upwardly or downwardly or upwardly and downwardly to match a complementary edge of a slot in the side of the housing.

4. The improved container of claim 3 wherein the tray has 2 tabs one on each of the outside edges of the legs of said tray and said housing has slots on both of its sides.

5. The improved container of claim 1 wherein the tray has at least one tab on the outside edge of at least one of the legs of said tray, said tab having an upper surface angled either upwardly or downwardly to match a similarly angled edge of a slot in the side of the housing.

6. The improved container of claim 5 wherein the tray has 2 tabs one on each of the outside edges of the legs of said tray and said housing has slots on both of its sides.

7. The improved container of claim 1 wherein there is an additional stop surface added to the drawer's sidewalls, making the drawer stop without applying a force on the tray.

8. The improved container of claim 1 wherein there is a curved cross brace that guides the tray card's rear spine past and under the center portion of the brace without catching.

9. The improved container of claim 1 wherein there is a wiper on at least one of the inner edges of the legs of the tray, said wiper being angled upwardly to hold the second article in the container until the user pulls it out.

10. The improved container of claim 9 wherein there is a wiper on both of the inner edges of the legs of the tray.

11. The improved container of claim 1 wherein the tray has at least one tab on an outside edge of at least one of the legs of said tray, said tab having a forward angled projection on its leading edge which matches a complementarily angled forward edge of a slot in the housing of the container, thereby preventing the tab from slipping out of the slot.

* * * * *